US012778727B2

(12) United States Patent
Aqel

(10) Patent No.: US 12,778,727 B2
(45) Date of Patent: Nov. 3, 2026

(54) HIGH-VOLUME EVACUATOR SUCTION TIP

(71) Applicant: Fadi Aqel, Burbank, IL (US)

(72) Inventor: Fadi Aqel, Burbank, IL (US)

(73) Assignee: Fadi Aqel, Burbank, IL (US)

( * ) Notice: Subject to any disclaimer, the term of this patent is extended or adjusted under 35 U.S.C. 154(b) by 0 days.

(21) Appl. No.: 19/081,990

(22) Filed: Mar. 17, 2025

(65) Prior Publication Data

US 2025/0352314 A1 Nov. 20, 2025

Related U.S. Application Data

(63) Continuation-in-part of application No. 18/669,286, filed on May 20, 2024.

(51) Int. Cl.
*A61C 17/08* (2006.01)

(52) U.S. Cl.
CPC .................................... *A61C 17/08* (2019.05)

(58) Field of Classification Search
CPC .............................. A61C 17/08; A61C 17/092
See application file for complete search history.

(56) References Cited

U.S. PATENT DOCUMENTS

| | | | | |
|---|---|---|---|---|
| 4,586,900 | A | 5/1986 | Hymanson | |
| 5,489,276 | A | 2/1996 | Jamshidi | |
| 7,744,371 | B1 | 6/2010 | Griffin | |
| 2003/0134254 | A1 | 7/2003 | Filho | |
| 2019/0274800 | A1* | 9/2019 | Sidhu | A61C 17/08 |
| 2019/0336255 | A1* | 11/2019 | Clasen | A61C 17/08 |
| 2021/0338393 | A1* | 11/2021 | Thomas | A61C 17/08 |
| 2021/0338398 | A1* | 11/2021 | Thomas | A61C 17/08 |

FOREIGN PATENT DOCUMENTS

JP 2019058497 4/2019

OTHER PUBLICATIONS

JP-201905847 English Translation by Clarivate Analytics (Year 2026).*

International Search Report and the Written Opinion, PCT /US2023/026807, Aqel, Fadi, Oct. 2, 2023.

Plasdent Plastic High Volume Evacuation Tips 100/Pk. Neon Colors, Vented, by Plasdent, https://www.net32.com/ec/plasdent-plastic-high-volume-evacuation-tips-100-d-54727.

OraVac Plastic HVE Tips—White, Vented 100/Pk. Molded in rigid plastic, by Plasdent, https://www.net32.com/ec/oravac-plastic-hve-tips-white-vented-100-d-36839.

BeeSure Comfy High-Volume Evacuator Tips Green 100/Pk. Vented and with soft, by EcoBee, https://www.net32.com/ec/beesure-comfy-highvolume-evacuator-tips-green-100-d-160683.

* cited by examiner

*Primary Examiner* — Eric J Rosen
*Assistant Examiner* — Hao D Mai

(57) ABSTRACT

A suction member for a high-volume evacuator (HVE) suction tool used in dental procedures. The suction member has a connection portion at a proximal end, a tubular portion connected to the connection portion, and a suction tip connected to the tubular portion at a distal end. The suction tip includes a plurality of distally protruding lobes and open-ended peripheral vent openings alternating about its circumference. The distal ends of the lobes are generally aligned in an oblique distal tangent plane inclined relative to a longitudinal axis of the tubular portion. The vent openings are spaced closer together towards a front side of the suction member, and the lobes include a widest rear lobe that is useful for soft tissue retraction.

19 Claims, 6 Drawing Sheets

HIGH-VOLUME EVACUATOR SUCTION TIP

CROSS REFERENCE

This application is a continuation in part of U.S. patent application Ser. No. 18/669,286, filed May 20, 2024, entitled "HIGH-VOLUME EVACUATOR SUCTION TIP;" which is continuation in part of U.S. patent application Ser. No. 18/215,851, filed Jun. 29, 2023, entitled "HIGH-VOLUME EVACUATOR SUCTION TIP;" which in turn claims the priority benefit of U.S. Provisional Pat. App. No. 63/357,703, filed Jul. 1, 2022, entitled "HIGH-VOLUME EVACUATOR SUCTION TIP," each of which is hereby incorporated by reference in its respective entirety.

FIELD OF THE DISCLOSURE

The present disclosure relates to suction tips for vacuum suction of materials out of a dental patient's mouth, and more particularly to high-volume evacuator suction tips.

BACKGROUND

Dental procedures, such as regular cleanings, cavity fillings, and other procedures, routinely require the suction of fluids away from an area of a patient's mouth, to make the area easier to see and work on, as well as to remove debris and aerosols, while keeping an exam room or office safe from the aerosols escaping the patient's mouth and entering the surrounding air. One type of suction tool is a saliva ejector, which is a relatively light duty, hands-free tool routinely used to remove excess water, saliva, and other liquids, using a flexible tip that a dentist can simply bend and hook onto a patient's lower lip. Another type of suction tool is a handheld high-volume evacuator (HVE) suction tool, which uses a straight, non-bending suction tip to apply heavier-duty suction to remove not only liquids, but also debris and aerosols.

Existing HVE suction tools have several drawbacks. For example, the strong suction tends to produce excessive noise, as well as frequently sucking a patient's soft tissue into the suction tip, which not only plugs the tip so as to prevent the tool from removing material, but also can cause a patient discomfort and possible laceration of the soft tissue. This has been known to occur when an existing HVE tool is used for suction and/or when a side or end of the tool is used to retract a patient's inner lip and/or cheek tissue away from the area being worked on. When used for retraction, holding the tool tip at too great an angle to the surface of the retracted tissue can result in the tissue suddenly occluding and then plugging the tip, whereas holding the top at too slight an angle can allow the retracted tissue to slide off the end of the tool, potentially into the area of a procedure, where the tissue obstructs the dentist's view of and access to the area and may risk being lacerated by another tool that is being used in the area, such as a pick or drill. Therefore, when using existing HVE tools, a significant part of a dentist's attention and effort has to be devoted to holding the tool with the suction tip placed and angled so as to avoid plugging the tip with a patient's soft tissue, which is compounded by the unpleasant and distracting noise level being produced by the tool at the same time.

A need therefore exists for an improved HVE tool that is quieter and less prone to soft-tissue plugging.

SUMMARY

According to an aspect of the disclosure, a suction member for connection to a dental vacuum source comprises a distal end, a proximal end, a front side, a rear side opposite the front side, the distal and proximal ends defining longitudinal distal and proximal directions and the front and rear sides defining forward and rearward directions. A frontal midplane divides the suction member into a front portion forward of the frontal midplane and a rear portion rearward of the frontal midplane. The suction member has right and left sides defining leftward and rightward directions orthogonal to the rearward and forward directions and to the longitudinal directions. A median plane divides the suction member into a right portion rightward of the median plane and a left portion leftward of the median plane. The suction member comprises a suction tip, an elongate tubular portion, and a connection end portion. The suction tip is at the distal end and has a suction inlet passageway extending longitudinally therethrough. The elongate tubular portion is connected to the suction tip and extends away from the suction tip in the proximal direction, the tubular portion having a suction flow passageway extending longitudinally therethrough, the suction flow passageway being in fluid communication with the suction inlet passageway. The connection end portion is at the proximal end and is connected to the tubular portion and extends away from the tubular portion in the proximal direction, the connection end portion being adapted and configured to connect to the dental vacuum source so as to form a sealed suction flow path from the suction flow passageway into the dental vacuum source. The tubular portion includes a tubular portion axis that extends longitudinally in the proximal and distal directions at the intersection of the frontal midplane and the median plane, the tubular portion axis defining radial directions perpendicular to the tubular portion axis, a tubular portion inner surface, a tubular portion outer surface circumscribing the tubular portion inner surface, and a wall thickness extending from the tubular portion inner surface to the tubular portion outer surface, the tubular portion inner surface circumscribing the suction flow passageway, the tubular portion inner surface extending continuously around a perimeter of the suction flow passageway over a length of the tubular portion inner surface extending from the suction tip to the connection end portion. The suction tip comprises a plurality of lobes protruding distally from the tubular portion, the lobes being spaced apart circumferentially about the tubular portion axis to form a peripheral vent opening between each neighboring pair of the lobes, each peripheral vent opening extending proximally from a respective open distal end to a respective one of a plurality of proximally recessed surfaces and circumferentially from one of the lobes to a neighboring one of the lobes. Each of the lobes comprises a proximal lobe end, a distally facing distal lobe surface, a radially inwardly facing inner lobe surface, a radially outwardly facing outer lobe surface, and lateral lobe surfaces including a clockwise-facing lateral lobe surface and a counterclockwise-facing lateral lobe surface, each of the inner, outer, and lateral lobe surfaces extending distally from the proximal lobe end to the distal lobe surface, each lateral lobe surface extending radially outwardly from the inner lobe surface to the outer lobe surface, and each of the inner and outer lobe surfaces extending clockwise from the counterclockwise-facing lateral lobe surface to the clockwise-facing lateral lobe surface. The lobes comprise a single rear lobe and a plurality of frontal lobes. The rear portion of the suction member comprises the entire rear lobe, the right portion of the suction member comprising a portion of the rear lobe, and the left portion of the suction member comprising a portion the rear lobe. The suction inlet passageway extends proximally through the suction tip from a distal suction opening at the distal end of the suction member to the suction flow passageway, the suction inlet passageway being circumscribed by the inner lobe surfaces and the peripheral vent openings, such that the peripheral vent openings are in fluid communication with the suction inlet passageway. The connection end portion is adapted and configured to connect to the dental vacuum source to form a sealed suction flow path from the suction flow passageway into the dental vacuum source.

BRIEF DESCRIPTION OF THE DRAWINGS

Although the characteristic features of this disclosure will be particularly pointed out in the claims, the subject matter of the claims, and the manner in which it may be made and used, may be better understood by referring to the following description taken in connection with the accompanying drawings forming a part hereof, wherein like reference numerals refer to like parts throughout the several views and in which:

A person of ordinary skill in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1:
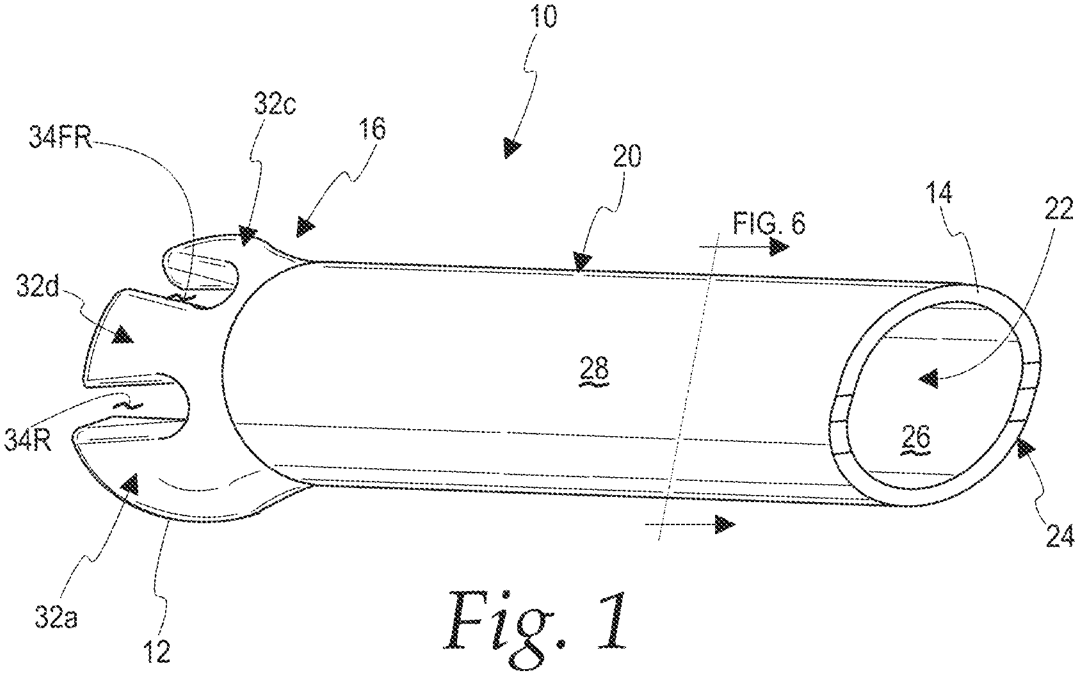
FIG. 1 is a right-proximal perspective view of a suction member according to an embodiment.
Figure 2:
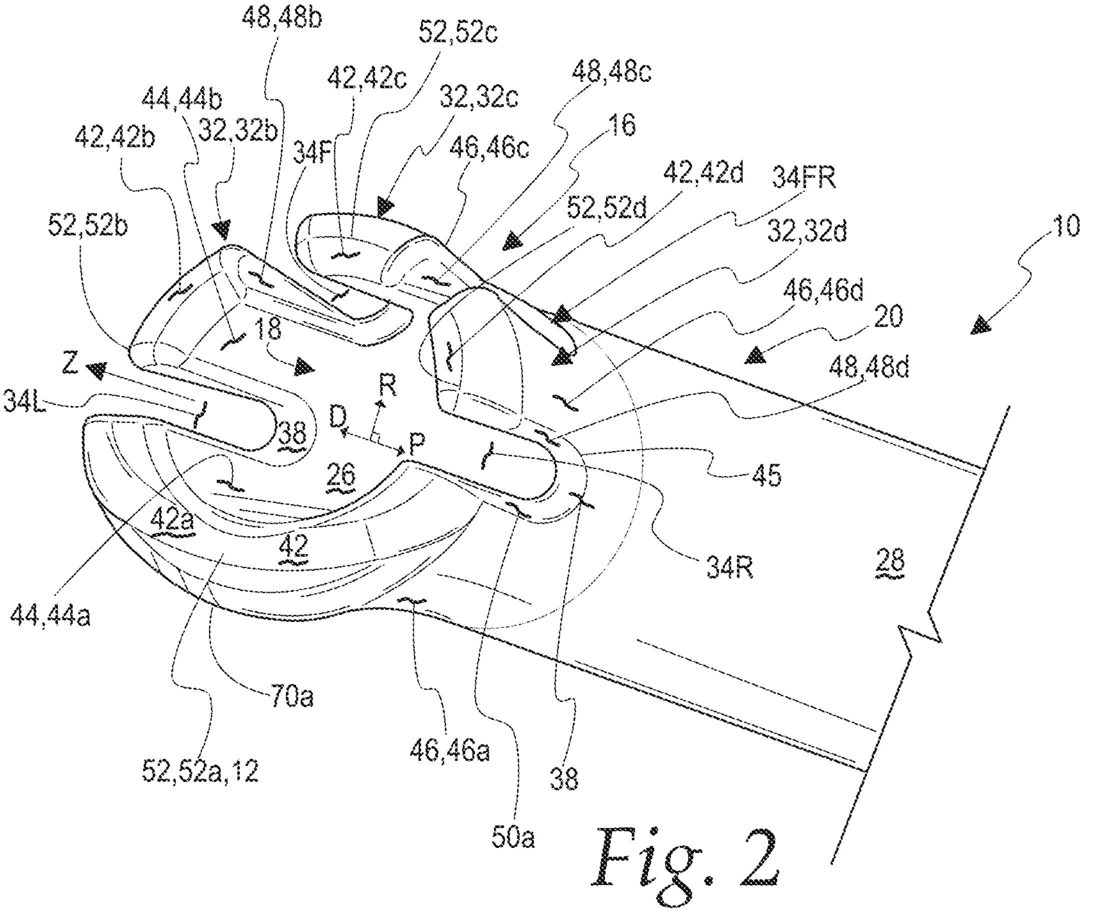
FIG. 2 is a truncated right-distal perspective view of a distal end portion of the suction member of FIG. 1.

An embodiment of a HVE suction member attachment according to the invention is described here and illustrated in FIGS. 1-6 of the accompanying drawings as a suction member 10 for connection to a dental vacuum source, for use in evacuating liquids and aerosols from a patient’s mouth during a dental procedure. Turning to FIGS. 1-2, The suction member 10 includes a distal end 12, a proximal end 14 spaced from the distal end 12 in a proximal longitudinal direction P, the distal end 12 conversely being spaced from the proximal end 14 in a distal longitudinal direction D. The suction member 10 includes a rounded suction tip 16 at the distal end 12, the suction tip 16 having a suction inlet passageway 18 extending longitudinally therethrough, and a plurality of transverse vent openings 34, described in more detail below. An elongate tubular portion 20 of the suction member 10 is connected to the suction tip 16 and extends away from the suction tip 16 in the proximal direction, the tubular portion 20 having a suction flow passageway 22 extending longitudinally therethrough. The suction flow passageway 22 is in fluid communication with the suction inlet passageway 18. As illustrated, the suction inlet and flow passageways 18, 22 are aligned to form a straight longitudinal flow path extending longitudinally through the entire length of the suction member 10. The suction member 10 further includes a connection end portion 24 at the proximal end 14, the connection end portion 24 being connected to the tubular portion 20 and extending away from the tubular portion 20 in the proximal direction. In an embodiment, the suction member 10, including the suction tip 16, the tubular portion 20, and the connection end portion 24, is of a one-piece molded plastic construction. The connection end portion 24 is adapted and configured to connect to a dental vacuum source (not shown) so as to form a sealed suction flow path from the suction flow passageway 22 into the dental vacuum source. As will be apparent to one skilled in the art in view of this disclosure, benefits provided by disclosed suction members include avoidance of soft tissue being sucked into a suction inlet passageway, quiet operation in use to remove fluids, debris, and aerosols from a patient’s mouth, avoidance of puncture of gingiva, and allowing suctioning of materials into the inlet passageway 18 in both longitudinal and transverse directions. In addition, in embodiments, the suction member has a suction tip with a flared shape (as in the illustrated suction tip 16 of the suction member 10), which enhances the function of the suction member as a retraction tool by using the suction tip to "hook" and pull a patient's soft tissue (for example the patient's cheek) out of the way of a treatment site.

The elongate tubular portion 20 has a tubular portion axis Z and includes a tubular portion inner surface 26, a tubular portion outer surface 28, and a wall thickness 30. The tubular portion axis Z extends longitudinally in the proximal and distal directions and further defines radial directions R perpendicular to the tubular portion axis Z. The tubular portion outer surface 28 circumscribes the tubular portion inner surface 26, such that the wall thickness 30 extends radially outwardly from the tubular portion inner surface 26 to the tubular portion outer surface 28. The tubular portion inner surface 26 circumscribes the suction flow passageway 22. More particularly, a perimeter of the tubular portion inner surface 26 is coextensive with that of the suction flow passageway 22 over a length of the tubular portion inner surface 26 that extends from the suction tip 16 to the connection end portion 24.

The suction tip 16 comprises a plurality of lobes, which are referred to collectively as lobes 32 and individually as lobes 32*a-d*, protruding distally from the tubular portion 20. The lobes 32 are spaced apart circumferentially about the tubular portion axis Z so as to form an open-ended peripheral vent opening 34 (individually, a left opening 34L, a front-left opening 34FL, a front-right opening 34FR, and a right opening 34R) between each neighboring pair of the lobes 32. In addition, the lobes 32 are spaced radially outwardly from the tubular portion axis Z so as to form a distal suction inlet opening 35. More particularly, the distal suction inlet opening 35 comprises an open area of the distal end 12 extending radially outwardly from the tubular portion axis Z to a discontinuous suction inlet perimeter 37 (shown in FIG. 5) formed by the lobes 32 and the peripheral vent openings 34, collectively.

Each peripheral vent opening 34 extends proximally from a respective open distal end 36 to a respective one of a plurality of proximally recessed surfaces 38 and circumferentially from one of the lobes 32 to a neighboring one of the lobes 32. The plurality of open distal ends 36 are further indicated at 36L, 36R, 36FR and 36FL respectively. Each of the lobes 32 comprises a proximal lobe end 40, a distally facing distal lobe surface 42, a radially inwardly facing inner lobe surface 44, a radially outwardly facing outer lobe surface 46, and lateral lobe surfaces including a clockwise-facing lateral lobe surface 48 and a counterclockwise-facing lateral lobe surface 50, each of the inner, outer, and lateral lobe surfaces 44, 46, 48, 50 extending distally from the proximal lobe end 40 to the distal lobe surface 42. As illustrated in the drawings, each outer lobe surface 46 tapers radially outwardly beyond an outer radius of the tubular portion outer surface 28. Alternatively, in other embodiments (not shown), one or more outer lobe surfaces, and up to all outer lobe surfaces of an embodiment, are comprised in an infinite cylindrical surface defined by a tubular portion outer surface of the suction member. Put another way, one or more outer lobe surfaces can be continuous longitudinal extensions of the tubular portion outer surface, rather than being outwardly flared or tapered. Each lateral lobe surface 48, 50 extends radially outwardly from the inner lobe surface 44 to the outer lobe surface 46, and each of the inner and outer lobe surfaces 44, 46 extends clockwise from the counterclockwise-facing lateral lobe surface 48, to the clockwise-facing lateral lobe surface 50. Each lobe 32 has a transverse wall thickness that corresponds to that of the tubular portion 20 at the respective proximal lobe end 40 and generally increases in the distal direction, except for in a rounded region adjacent the respective distal lobe surface 42, owing to the outward flare of the respective outer lobe surface 46 and longitudinal orientation of the respective inner lobe surface 44, as described in more detail below.

Each lobe 32 is free of sharp features (e.g., vertices, points, or angled edges) over an area that extends continuously over the outer, distal, and lateral lobe surfaces 46, 42, 48, 50. That is, each of these surfaces is free of sharp features over its own area, and one or both of each neighboring pair of these surfaces includes a smooth (i.e., rounded or curved) transition to the neighboring surface. More particularly, each lobe 32 is free of sharp features throughout an area that extends continuously over its inner, outer, distal, and lateral lobe surfaces 44, 46, 42, 48, 50. Likewise, as best seen in FIG. 2, the proximally recessed surfaces 38 and the transitions from the surfaces 38 to the neighboring lateral lobe surfaces 48, 50 and tubular portion outer surface 28 are all free of sharp features, the proximally recessed surfaces 38 thus being illustrated with concave circumferential contours and convex radial contours over their entire areas (in other embodiments, the surfaces 38 may have a planar central region bordered by circumferentially concave/radially convex transition regions). Still more particularly, the transitions between the tubular portion inner surface 26 and the proximally recessed surfaces 38 and between the lobe inner surfaces 44 and the lobe end and lateral surfaces 42, 48, 50 can also be free of sharp features, for example comprising a convex rounded edge extending continuously around the inner periphery of the suction tip 16, along the three radially inner edges of each lobe 32 and each peripheral vent opening 34. The foregoing aspects beneficially tend to avoid sharp features impinging a dental patient's soft tissues during use of the suction member 10. In another embodiment not shown, each lobe may include a distal end portion made of a softer material than the rest of the suction member, the lobe distal end portions comprising at least a portion of a distal lobe surface of each lobe. Such lobe distal end portions can be affixed to the lobes by overmolding, adhesive, or other suitable connection.

In addition, each outer lobe surface 46 transitions smoothly to the tubular portion outer surface 28, and each inner lobe surface 44 transitions smoothly to the tubular portion inner surface 26, at the corresponding proximal lobe end 40. More particularly, the tubular portion inner surface 26 has a uniform perpendicular cross section 51, as shown in FIG. 6, and the inner lobe surfaces 44 are comprised within a cylinder of infinite length defined by inner surface 26. Put another way, the inner lobe surfaces 44 are comprised within a cylinder projected from the cross section 51 in the Z direction. Still more particularly, the inner lobe surfaces 44 are comprised by longitudinal extensions of segments of the tubular portion inner surface cross section 51. That is, the perpendicular cross sections of the inner lobe surfaces 44, cut anywhere across the Z-axis of the tubular portion 20, are aligned longitudinally with portions of the cross section 51, and collectively constitute the segments of the discontinuous inlet perimeter 37 shown in FIG. 5, which has the same overall shape as the cross section 51, but with discontinuities at each peripheral inlet opening 34. More particularly, the uniform perpendicular cross section 51 is in the shape of a circle, the tubular portion inner surface 26 being in the form of a right circular cylinder. In other embodiments, a tubular portion inner surface may be an elliptical cylinder or a cylinder of other cross-sectional shape.

Figure 4:
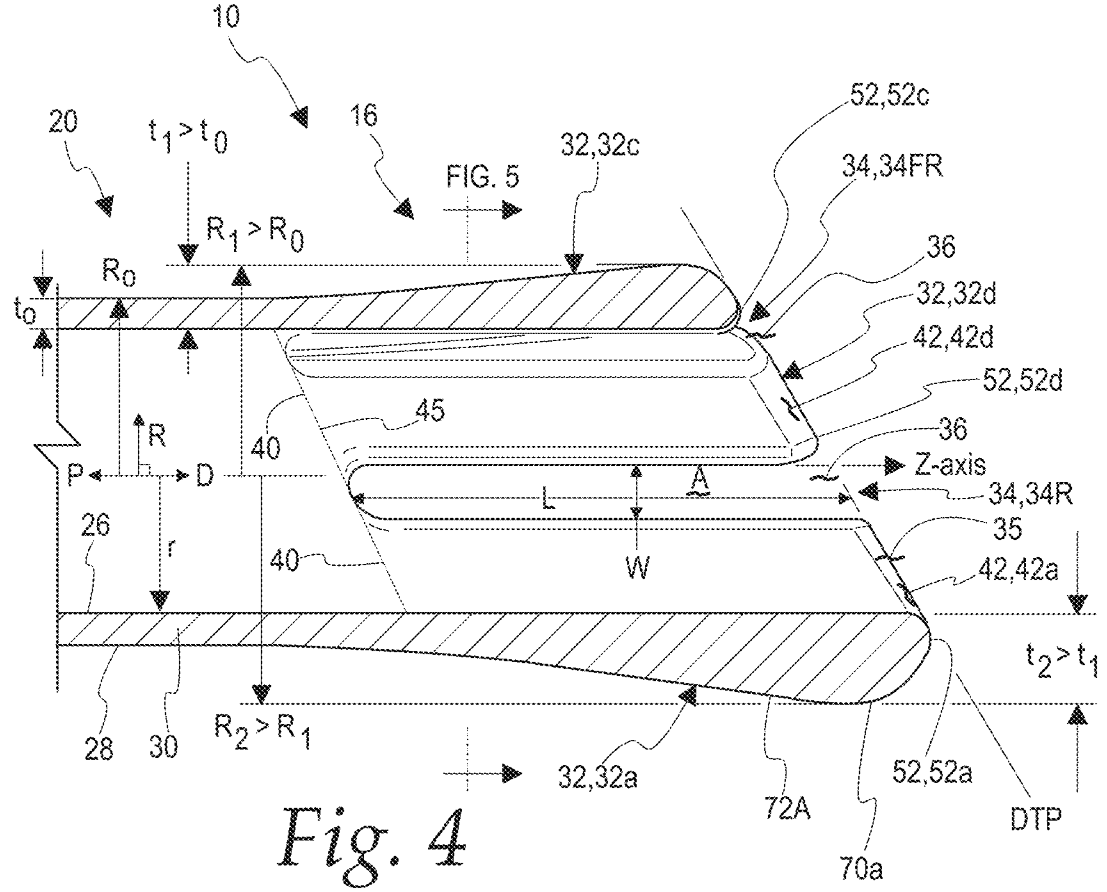
FIG. 4 is a left-side median plane cross-sectional view of the suction member of FIG. 1.

The distal lobe surfaces 42 comprise distal lobe ends 52 of the respective lobes 32, and in the illustrated embodiment, the distal lobe ends 52 share a common distal tangent plane DTP, as shown in FIG. 4, the distal end 12 comprising the distal lobe ends 52. Accordingly, each peripheral vent opening 34 has a generally four-sided bypass flow cross section A with a generally circumferential width w (in the illustrated example, the width w is generally circumferential in that it spans a portion of a circumference of the suction tip 16, though the vent opening 34 can also be described more particularly as having a generally uniform linear tangential width w over at least a middle portion of its depth, the lateral lobe surfaces 48, 50 of the neighboring lobes 32 being generally parallel, rather than radially diverging so as to form a vent opening with a generally uniform circumferential angular span) corresponding to the spacing between neighboring lobes 32 and a longitudinal length L corresponding to the lengths of the neighboring lobes 32. More particularly, in the illustrated embodiment, the recessed surfaces 38 are formed at a beveled cutoff 45 of the tubular portion 20, and the distal tangent plane DTP of the distal end 12 (which comprises the open distal ends 36 of the vent openings 34) is generally parallel to a plane of the beveled cutoff 45, so that the flow cross sections A are generally circumscribed by parallelograms spanning a generally circumferential gap between neighboring lobes 32 and a length from the beveled cutoff 45 to the distal end 12, the proximal ends of the flow cross sections A being rounded off tangent to the beveled cutoff 45.

The suction inlet passageway 18 extends proximally through the suction tip 16 from a distal suction opening 35 at the distal end of the suction member 10 to the suction flow passageway 22 and is circumscribed by the inner lobe surfaces 44 and the peripheral vent openings 34. Thus, the peripheral vent openings 34 are in fluid communication with the suction inlet passageway 18 and with the suction flow passageway 22 via the suction inlet passageway 18.

By facing radially outwardly and extending proximally away from the distal end 12, the peripheral vent openings 34 provide venting air pathways into the suction inlet passageway 18 which bypass the distal suction inlet opening 35. That is, even when the distal suction inlet opening 35 is fully covered by a planar obstruction, the suction tip 16 is not fully occluded. More particularly, the venting air pathways sufficiently relieve suction pressure from the distal suction inlet opening 35 so as to avoid tissue plugging of the suction tip 16 when the suction member 10 is held in such a position that a patient's soft tissue overlaps the entire distal suction inlet opening 35 in the distal tangent plane DTP but does not at the same time overlap the peripheral vent openings 34. Advantageously, the peripheral vent openings 34 face in a plurality of different radial directions, so that the suction tip 16 can be positioned in a patient's oral cavity with the suction member 10 held at a plurality of different angles in which at least one of the peripheral vent openings 34 is exposed so as to vent suction pressure.

In addition, the peripheral vent openings 34 can provide inlet pathways not only for pressure relief airflow but also for a primary inlet flow containing the materials that the suction member 10 is used to evacuate from a patient's oral cavity (e.g., saliva, other liquids, and aerosols). In particular, the vent openings 34 having open distal ends 36 at the distal end 12 of the suction member enables a user to easily align at least one of the peripheral vent openings 34 and/or the distal suction opening 35 facing material to be evacuated, so as to produce suction tending to draw the material proximally and/or radially inwardly into the suction inlet passageway 18, simply by holding the suction member 10 with an edge of its distal end 12 near or touching the site of the material, at an oblique angle to the site, and with the suction member 10 positioned at a rotational angle about its axis so that at least one of the vent openings 34 faces generally toward the site of the material to be evacuated. To facilitate such rotational alignment of the suction member 10, the peripheral vent openings 34 are clustered together within a particular circumferential region of the suction tip 16, rather than being spaced throughout its circumference, as described in the following paragraphs.

Figure 3:
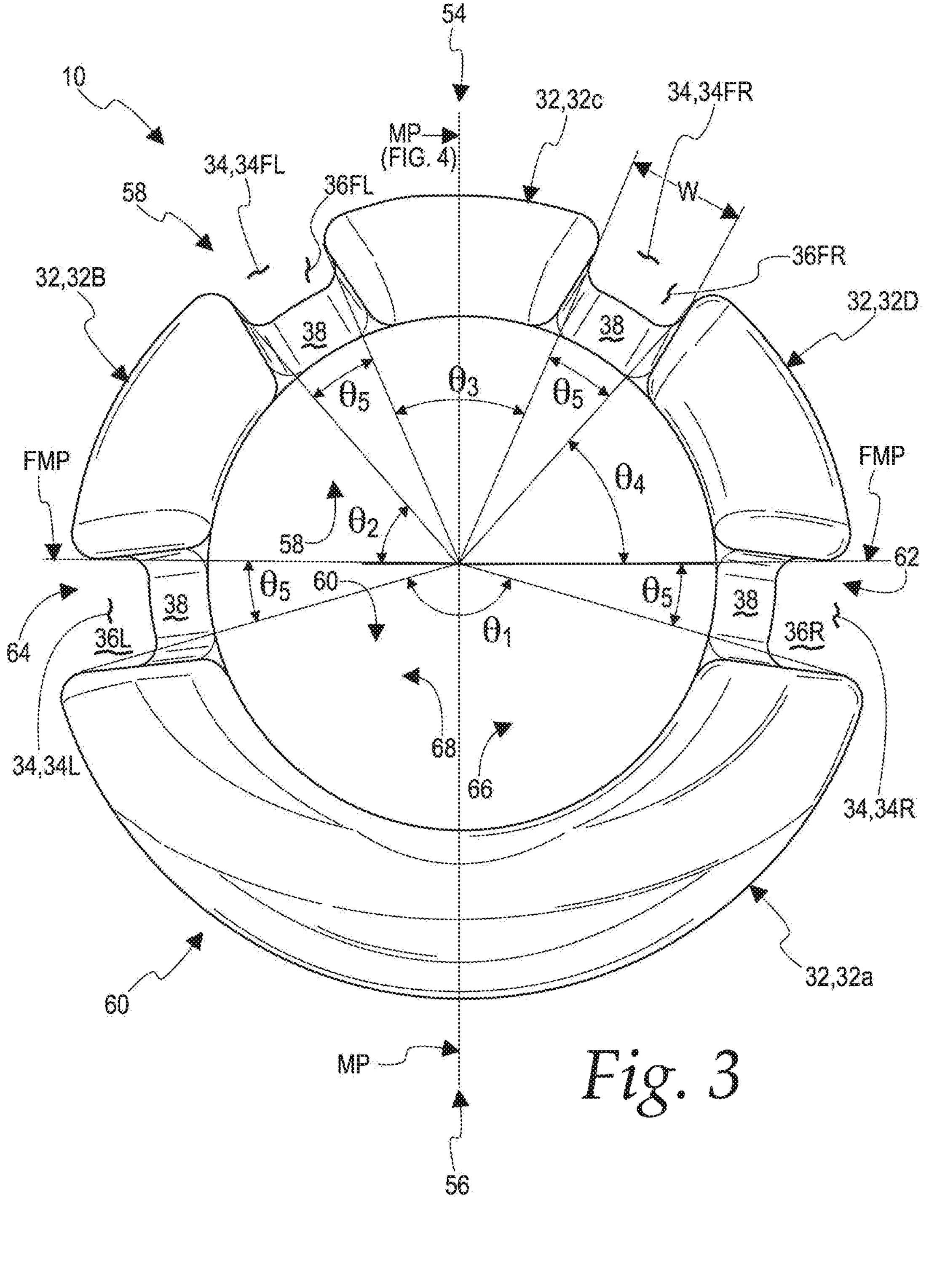
FIG. 3 is a distal end plan view of the suction member of FIG. 1.

Turning to FIG. 3, the suction member 10 is shown as having a front side 54 and a rear side 56 opposite the front side 54, the rear side 56 being spaced from the front side 54 in a rearward direction orthogonal to the longitudinal directions, and, conversely, the front side 54 being spaced from the rear side 56 in a forward direction opposite to the rearward direction. A frontal midplane FMP is shown as dividing the suction member 10 into a front portion 58 forward of the frontal midplane FMP and a rear portion 60 rearward of the frontal midplane FMP. In addition, the suction member 10 is shown as having a right side 62 and a left side 64 opposite the right side 62, the left side 64 being spaced from the right side 62 in a leftward direction orthogonal to the rearward and forward directions and to the longitudinal directions, and, conversely, the right side 62 being spaced from the left side 64 in a rightward direction opposite to the leftward direction. A median plane MP is shown as dividing the suction member 10 into a right portion 66 rightward of the median plane and a left portion 68 leftward of the median plane.

With reference to the sides, planes, and portions of the suction member 10 now defined, the lobes 32 can be said to comprise a single rear lobe 32*a* and a plurality of frontal lobes 32*b*, 32*c*, 32*d*. The rear lobe 32*a* is the broadest of the lobes 32, spanning an angle $\Theta_1$ about the tubular portion axis Z from about 120° to about 160°, more particularly from about 130° to about 150°, and still more particularly about 140°. The rear portion 60 of the suction member 10 comprises the entire rear lobe 32*a*, while the right portion 66 of the suction member comprises a part of the inner rear lobe surface 44*a*, and the left portion 68 of the suction member comprises a remaining part the inner rear lobe surface 44*a*. That is, part of the inner rear lobe surface 44*a* lies in a right-rear quadrant of the suction member 10, and part of the inner rear lobe surface 44*a* lies in a left-rear quadrant of the suction member 10. More particularly, the rear lobe 32*a* is symmetric in form with respect to the median plane MP, half being comprised in the right portion 66 and another half being comprised in the left portion 68 of the suction member 10. Still more particularly, the entire suction member 10 is symmetric with respect to the median plane MP.

The front portion 58 of the suction member 10 comprises the entirety of each of the frontal lobes 32*b-d*. More particularly, the front portion 58 comprises an entirety of each of the frontal lobes 32*b-d*. The peripheral vent openings 34 can be said to comprise a righthand lateral vent opening 34R, a lefthand lateral vent opening 34L, a front-left vent opening 34FL, and a front-right vent opening 34FR. The lateral vent openings 34R, 34L are intersected by the frontal midplane FMP. With reference to FIG. 3, each of the frontal lobes 32*b*, 32*c*, 32*d* spans a respective angle $\Theta_2$, $\Theta_3$, $\Theta_4$ about the tubular portion axis from about 40° to about 50°. More particularly, each of the lateral frontal lobes 32*b*, 32*d* spans an angle $\Theta_2$, $\Theta_4$ of about 48°, and the foremost frontal lobe 32*c* spans an angle $\Theta_3$ of about 45°. Each of the peripheral vent openings 34 spans an angle $\Theta_5$ from about 10° to about 30°, more particularly from about 15° to about 25°, and still more particularly from about 19° to about 20°. The angular span of each of the lateral vent openings 34R, 34L lies approximately entirely in the rear portion 60 of the suction member 10, but at the very front of it, each approximately reaching the frontal midplane FMP. Put another way, the vent openings 34 are entirely confined to a circumferential region comprised in the foremost 220° of the circumference of the suction tip 16, covering about 35-36% of a circumferential area of that 220° region, and about 21-22% of a circumferential area of the front 180° span of the suction tip 16, which is to say, the portion of the suction tip 16 comprised in the front portion 58 of the suction member 10, forward of the frontal median plane FMP, also referred to as a front side of the suction tip 16. It can also be observed that no part of the front side of the suction tip 16 is spaced circumferentially more than 24° (half the angular span of each of the lateral frontal lobes 32*b*, 32*d*) from a nearest one of the peripheral vent openings 34.

While the clustering of the peripheral vent openings 34 toward the front side of the suction tip 16 facilitates the use of the suction tip 16 to draw in evacuated material transversely as well as longitudinally as just described, the rear side of the suction tip 16 being free of vent openings over the approximately 140° span of the rear lobe 32*a* facilitates the use of the rear side as a retraction implement, that is, to engage and push or pull a patient's flexible soft tissue away from a dental procedure site. In addition to being the circumferentially broadest of the lobes 32, the rear lobe 32*a* also comprises the distalmost extent of the suction member 10 at its distal lobe end 52*a*, being that the distal tangent plane DTP is inclined distally towards the rear side 56 of the suction member 10. This tends to isolate the rear side of the rear lobe 32*a* from any transverse suction pressure tending to draw suction flow transversely through the distal suction inlet opening 35, as the rear lobe 32*a* extends distally beyond the distal suction inlet opening 35. Thus, the distal and outer rear lobe surfaces 42*a*, 46*a* can be pressed against a patient's soft tissue without resulting in undesired transverse suction forces being applied to the tissue, as well as avoiding or limiting corner transitions or tight gaps at a region that is pressed against soft tissue, such as might uncomfortably prod or pinch the tissue independently of any suction force. In addition, the outer rear lobe surface 46*a* flares outwardly to a larger maximum radius, at an outer apex 70*a* (FIGS. 2, 4), than that of the other outer lobe surfaces 46, as well as having a steeper incline relative to the axis Z than the other outer lobe surfaces 46, particularly over a hook region 72*a* (FIG. 4). Taken together, the relatively steep incline of the hook region 72*a* and large radius of the outer apex 70*a* help a dentist to position the suction member 10 so that the rear lobe 32*a* plunges somewhat into a depth of a patient's retracted soft tissue, helping to hold the tissue in a desired retracted position by "hooking" the tissue so as to restrain it from sliding off of the suction member 10 over the distal lobe end 52*a*.

Figure 5:
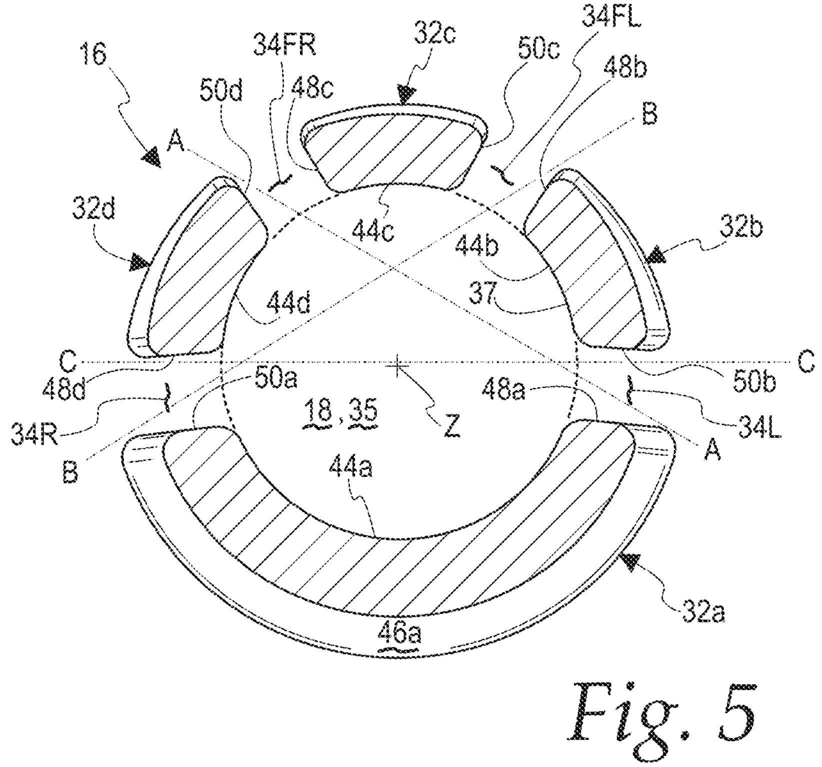
FIG. 5 is a proximal-end plan view of a cross section cut perpendicular to the axis of the suction member of FIG. 1.
Figure 4A:
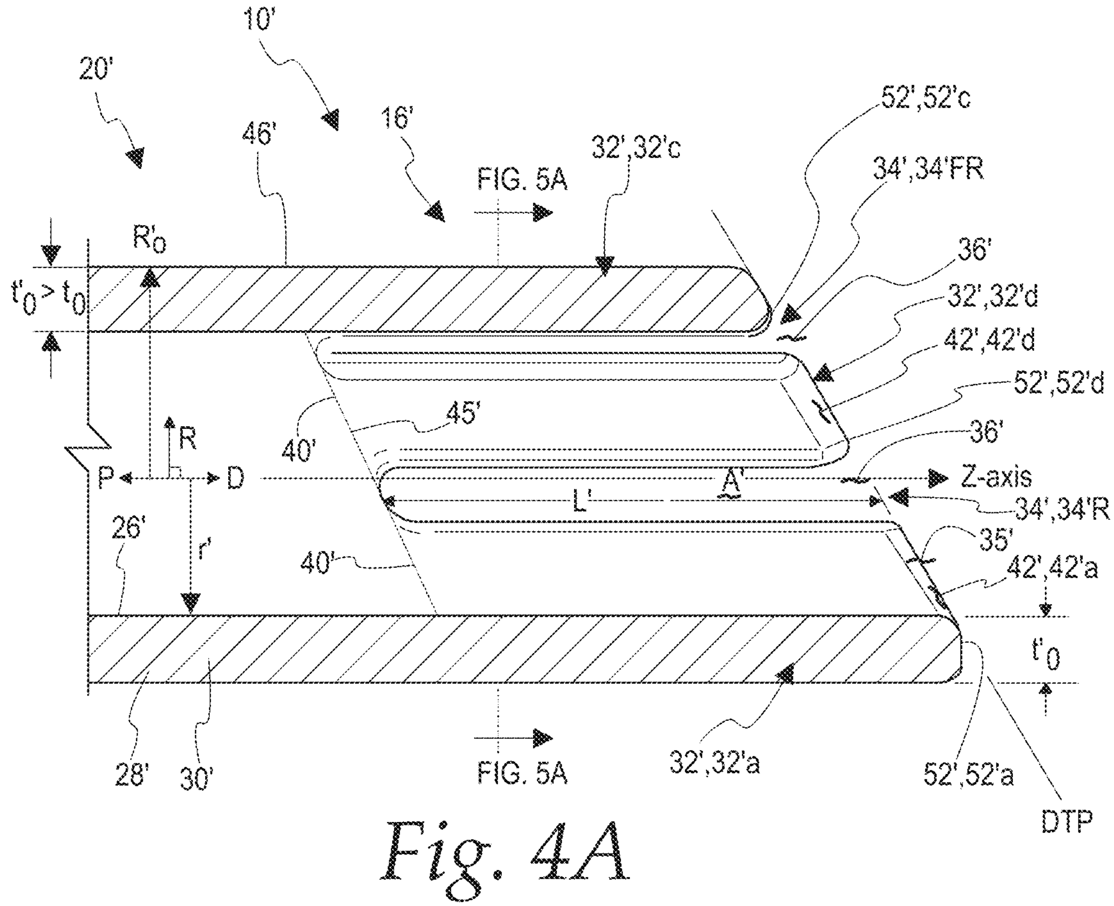
FIG. 4A is a left-side median plane cross-sectional view of a suction member having a more gradually tapered distal end region.
Figure 5A:
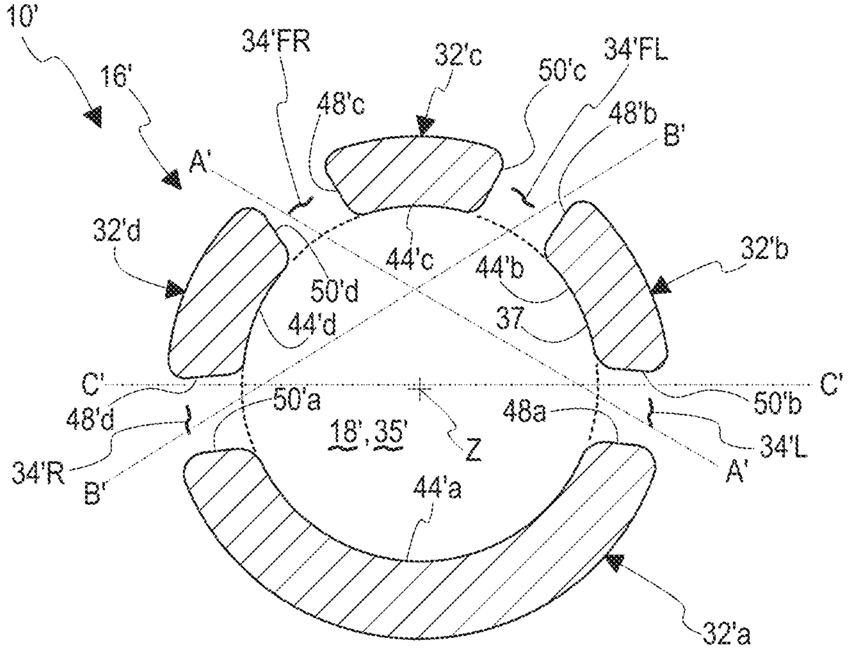
FIG. 5A is a proximal-end plan view of a cross section cut perpendicular to the axis of the suction member of FIG. 4A.
Figure 6:
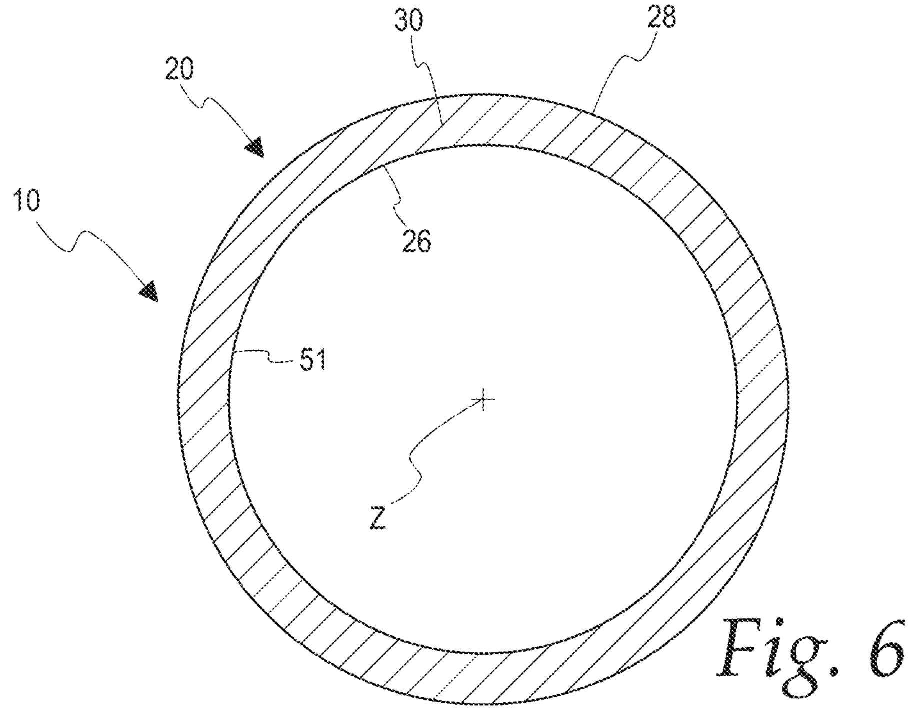
FIG. 6 is a distal-end plan view of another cross-section cut perpendicular to the axis of the suction member of FIG. 1.

Another embodiment of a suction member 10' is illustrated in longitudinal median-plane and perpendicular cross-sectional views of FIGS. 4A, 5A, analogous to those of FIGS. 4, and 5. Features of the suction member 10' analogous to those of the suction member 10 are labeled in FIGS. 4A and 5A with like reference numerals to those appearing in FIGS. 4 and 5, with a single prime symbol (') appended thereto. The suction member 10' has a rounded suction tip 16' that has a straight cylindrical profile extending distally from a beveled cutoff 45' of a tubular portion 20' along the outer surfaces of lobes 32' to their rounded distal lobe ends 52' (individually illustrated in FIG. 4A as distal lobe ends 52'*a*, 52'*c*, 52'*d* of individual lobes 32'*a*, 32'*c*, 32'*d*). Likewise, an inner radius r' of the suction member 10' is uniform along its entire length including in region of the suction tip 16', such that the suction member 10' has a uniform radial wall thickness t'0 substantially everywhere, exclusive of the rounded edges of the suction tip 16'. A benefit of the straight profile of the suction tip 16' of the suction member 10' (FIG. 4A), compared to the flared suction tip 16 of the suction member 10 (FIG. 4), is the relative ease of molding the suction member 10' as one piece. At the same time, lobes 32'*a-d* of the suction member 10' are preferably thick enough to avoid uncomfortably prodding or gouging a patient's oral tissues. Consequently, it may be desirable for the uniform thickness t'0 of the suction member 10' to be at least about 1 mm. In contrast, a smaller base thickness to of the tubular portion 20 of the suction member 10, shown in FIG. 4, may be desired—for example, to save material—and can be provided without determining the lobe thicknesses t1 or t2 of the flared suction tip 16 (with the trade-off that the latter may result in the suction member 10 being more difficult to mold as one piece than the suction member 10', as noted above). For example, the base thickness t0 can be about 0.5 mm, expanding to an apex thickness t1 of the foremost frontal lobe 32*c* of about 2.2 mm and an apex thickness t2 of the rear lobe 32*a* of about 2.6 mm. The uniform inner radius r' of the suction member 10' may be substantially the same as a uniform inner radius r of the suction member 10, such as from about 4 mm to about 5 mm. An outer radius R'0 of the suction member 10' (FIG. 4A) is equal to the sum of the inner radius r' and the uniform thickness t'0, while a base outer radius R0 of the tubular portion 20 of the suction member 10 (FIG. 4) is equal to the sum of the inner radius r and the base thickness t0. Thus, it may result that a desired outer radius R'0 of the suction member 10' is greater than a desired base outer radius R0 of the suction member 10. For example, the outer radius R0 can be from about 5 mm to about 6 mm, and the outer radius R'0 can be from about 5.5 mm to about 6.5 mm. Also indicated in FIG. 4 are outer radii R1, R2, of the outermost points on the lobes 32*c*, 32*a* of respective thicknesses t1, t2, where R1=r+t1, R2=r+t2, and R2>R1>R0.

A beneficial crossflow feature common to the embodiments of the suction member 10 and the suction member 10' is illustrated in the perpendicular cross-sectional views of FIGS. 4A and 5A, respectively. In particular, in both embodiments, each pair of peripheral vent openings 34, 34' separated by at least two of the frontal lobes 32*b-d*, 32'*b-d* along a circumferential path that excludes the rear lobe 32*a*, 32'*a* has an unobstructed crossflow pathway that extends through such pair of peripheral vent openings 34, 34'. Thus, a crossflow pathway A-A, A'-A' extends between the left opening 34L, 34'L and the front-right opening 34FR, 34'FR; a crossflow pathway B-B, B'-B' extends between the right opening 34R, 34'R and the front-left opening 34FL, 34'FL; and a crossflow pathway C-C, C'-C' extends through the left opening 34L, 34'L and the right opening 34R, 34'R, each of the crossflow pathways A-A, A'-A', B-B, B'-B', C-C, C'-C' extending through the corresponding openings and across the suction inlet passageway 18, 18', each along a straight line that extends infinitely in opposite directions without impinging the suction member 10, 10'.

Figure 7:
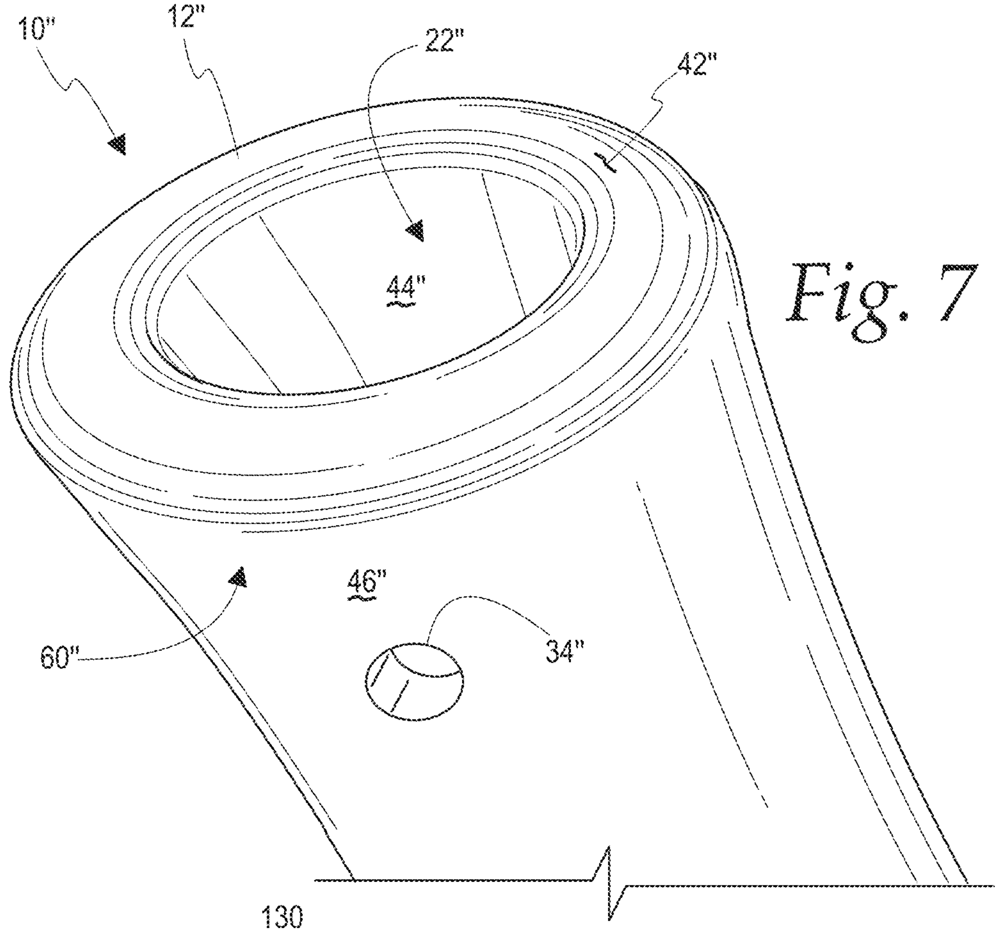
FIG. 7 is a truncated right-rear-distal perspective view of a distal end portion of a suction member according to another embodiment.

Still another embodiment of a suction member 10" is shown in FIG. 7. The suction member 10" has the same overall profile shape as the suction member 10. The suction member 10" comprises a rounded suction tip 16" that extends to a distal end 12", the distal end 12" being comprised in a continuous distal end surface 42", the continuous distal end surface 42" being uninterrupted by proximal recesses analogous to those of the peripheral openings 34 of the suction member 10. Instead, the suction tip 16" has a single peripheral vent hole 34" formed therein, the vent hole 34" extending from an outer opening formed in an outer peripheral surface 46" to an inner opening formed in an inner peripheral surface 44" of the suction tip 16", the vent hole 34" being defined by a continuous sidewall that extends from the outer opening to the inner opening, and the vent hole 34" having no other openings. More particularly, the vent hole 34" is formed in a rear portion 60" of the suction member 10" that is analogous to the rear portion 60 of the suction member 10. The inner peripheral surface 44" defines a distal end portion of a suction flow passageway 22" that extends longitudinally through the suction member 10".

Figure 5B:
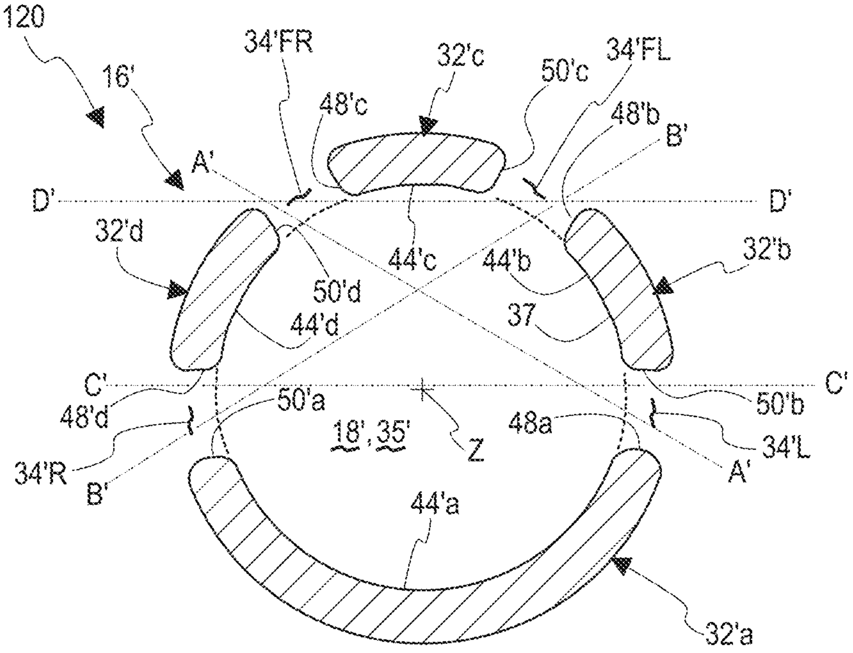
FIG. 5B is a proximal-end plan view of a cross section cut perpendicular to the axis of a suction member according to an embodiment.

Another embodiment of a suction member 120 is illustrated in perpendicular cross-sectional view of FIG. 5B, analogous to those of FIGS. 5, and 5A. Features of the suction member 120 analogous to those of the suction member 10' are labeled in FIG. 5B with like reference numerals to those appearing in FIGS. 5 and 5A. In the suction member 120, each pair of peripheral vent openings 34, 34' separated by at least two of the frontal lobes 32*b-d*, 32'*b-d* along a circumferential path that excludes the rear lobe 32*a*, 32'*a* has an unobstructed crossflow pathway that extends through such pair of peripheral vent openings 34, 34'. Furthermore, the pair of peripheral vent openings 34'FR and 34'FL also has an unobstructed crossflow pathway D'-D' that extends through them. The crossflow pathway that extends through the pair of peripheral vent openings 34'FR and 34'FL and across the suction inlet passageway 18' is also referred to herein as an unobstructed crossflow pathway opposite the single rear lobe 32'*a*. The unobstructed crossflow pathway opposite the single rear lobe D-'D provides the same benefits of those of the unobstructed crossflow pathways A-A, A'-A', B-B, B'-B', C-C, and C'-C'.

Figure 8:
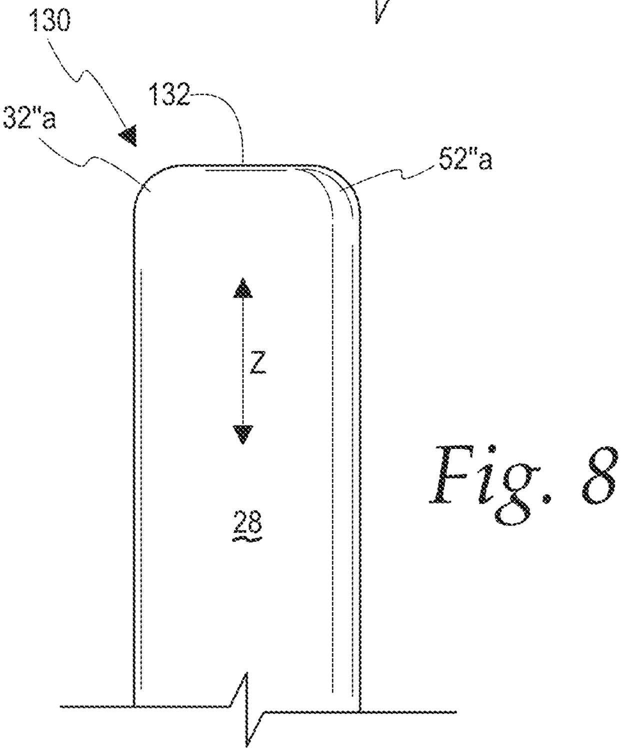
FIG. 8 is a rear side view of the distal end of a suction member according to an embodiment.

In a further embodiment 130 of the embodiment 120, the rear lobe end 52'*a* is modified to incorporate a flat arc portion 132. A rear view of the embodiment 130 is illustrated in FIG. 8. The modified rear lobe end is indicated at 52"*a* and the modified rear lobe 32'*a* is thus indicated at 32"*a*. The flat arc portion 132 is a portion of the rear lobe end 52"*a*, and perpendicular to the tubular portion axis Z. The flat arc portion 132 is a plane perpendicular to the tubular portion axis Z. With the flat arc portion 132, the inside surface of the rear lobe end 32'*a* is part of a cylindrical surface. In other words, the flat arc portion 132 is circular around the tubular portion axis Z and conforms to the tubular profile of the suction inlet passageway 18'. In one embodiment, the largest chord length of the flat arc portion's 132 inner side is approximately one half of the diameter of the suction inlet passageway 18'. This largest chord length is referred to herein as the chord length of the flat arc portion 132. In different embodiments, the chord length of the flat arc portion 132 is between forty percent and sixty percent of the diameter of the suction inlet passageway 18'.

These and other advantages of the invention will be further understood and appreciated by those skilled in the art by reference to the following written specification, claims and appended drawings. Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A suction member for connection to a dental vacuum source, the suction member comprising:

a distal end;

a proximal end spaced from the distal end in a proximal longitudinal direction, the distal end being spaced from the proximal end in a distal longitudinal direction;

a front side;

a rear side opposite the front side, the rear side being spaced from the front side in a rearward direction orthogonal to the longitudinal directions, and the front side being spaced from the rear side in a forward direction opposite to the rearward direction;

a frontal midplane dividing the suction member into a front portion forward of the frontal midplane and a rear portion rearward of the frontal midplane;

a right side;

a left side opposite the right side, the left side being spaced from the right side in a leftward direction orthogonal to the rearward and forward directions and to the longitudinal directions, the right side being spaced from the left side in a rightward direction opposite to the leftward direction;

a median plane dividing the suction member into a right portion rightward of the median plane and a left portion leftward of the median plane;

a suction tip at the distal end, the suction tip having a suction inlet passageway extending longitudinally therethrough;

an elongate tubular portion connected to the suction tip and extending away from the suction tip in the proximal direction, the tubular portion having a suction flow passageway extending longitudinally therethrough, the suction flow passageway being in fluid communication with the suction inlet passageway;

a connection end portion at the proximal end, the connection end portion being connected to the tubular portion and extending away from the tubular portion in the proximal direction, the connection end portion being adapted and configured to connect to the dental vacuum source so as to form a sealed suction flow path from the suction flow passageway into the dental vacuum source;

the tubular portion including a tubular portion axis extending longitudinally in the proximal and distal directions at the intersection of the frontal midplane and the median plane, the tubular portion axis defining radial directions perpendicular to the tubular portion axis, a tubular portion inner surface, a tubular portion outer surface circumscribing the tubular portion inner surface, and a wall thickness extending from the tubular portion inner surface to the tubular portion outer surface, the tubular portion inner surface circumscribing the suction flow passageway, the tubular portion inner surface extending continuously around a perimeter of the suction flow passageway over a length of the tubular portion inner surface extending from the suction tip to the connection end portion;

the suction tip comprising a plurality of lobes protruding distally from the tubular portion, the plurality of lobes being spaced apart circumferentially about the tubular portion axis to form a peripheral vent opening between each neighboring pair of the plurality of lobes, each peripheral vent opening extending proximally from a respective open distal end to a respective one of a plurality of proximally recessed surfaces and circumferentially from one of the plurality of lobes to a neighboring one of the plurality of lobes, wherein:

the peripheral vent openings comprise a righthand lateral vent opening and a lefthand lateral vent opening, the lateral vent openings being intersected by the frontal midplane; and the peripheral vent openings further comprise a front-right vent opening and a front-left vent opening;

each of the plurality of lobes comprising a proximal lobe end, a distally facing distal lobe surface, a radially inwardly facing inner lobe surface, a radially outwardly facing outer lobe surface, and lateral lobe surfaces including a clockwise-facing lateral lobe surface and a counterclockwise-facing lateral lobe surface, each of the inner, outer, and lateral lobe surfaces extending distally from the proximal lobe end to the distal lobe surface, each lateral lobe surface extending radially outwardly from the inner lobe surface to the outer lobe surface, and each of the inner and outer lobe surfaces extending clockwise from the counterclockwise-facing lateral lobe surface to the clockwise-facing lateral lobe surface;

the plurality of lobes comprising a single rear lobe and a plurality of frontal lobes, wherein:

each of the plurality of frontal lobes is entirely comprised in the front portion of the suction member;

the plurality of frontal lobes comprises a righthand lateral frontal lobe extending circumferentially from the righthand lateral vent opening to the front-right vent opening, a foremost frontal lobe extending circumferentially from the front-right vent opening to the front-left vent opening, and a lefthand lateral frontal lobe extending from the front-left vent opening to the lefthand lateral vent opening;

each pair of the peripheral openings that is separated by at least two of the plurality of frontal lobes along a circumferential path that excludes the rear lobe form an unobstructed crossflow pathway that extends through the pair of the peripheral openings and across the suction inlet passageway along a straight line that extends infinitely in opposite directions without impinging the suction member; and the front-right vent opening and the front-right vent opening forms an unobstructed crossflow pathway that extends through the front-right vent opening and the front-right vent opening and across the suction inlet passageway along a straight line that extends infinitely in opposite directions without impinging the suction member;

the rear portion of the suction member comprising the entire rear lobe, the right portion of the suction member comprising a portion of the rear lobe, and the left portion of the suction member comprising a portion of the rear lobe; and the suction inlet passageway extending proximally through the suction tip from a distal suction opening at the distal end of the suction member to the suction flow passageway, the suction inlet passageway being circumscribed by the inner lobe surfaces and the peripheral vent openings, such that the peripheral vent openings are in fluid communication with the suction inlet passageway.

2. The suction member of claim 1 wherein the rear lobe is symmetric with respect to the median plane.

3. The suction member of claim 2 wherein an entire form of the suction member is symmetric with respect to the median plane.

4. The suction member of claim 1 wherein the rear lobe spans an angle about the tubular portion axis between one-hundred twenty degrees and one-hundred sixty degrees.

5. The suction member of claim 1 wherein the plurality of frontal lobes includes three frontal lobes.

6. The suction member of claim 1 wherein the rear lobe includes a rear lobe end and the rear lobe end incorporates a flat arc portion.

7. The suction member of claim 6 wherein the flat arc portion has a chord length that is approximately one half of the diameter of the suction inlet passageway.

8. The suction member of claim 6 wherein the flat arc portion has a chord length that is between forty percent and sixty percent of the diameter of the suction inlet passageway.

9. The suction member of claim 1 wherein each of the plurality of frontal lobes spans a respective angle about the tubular portion axis less than fifty degrees.

10. The suction member of claim 1 wherein at least one of the plurality of lobes is disposed entirely within an infinite cylindrical volume circumscribed by an infinite cylindrical surface that comprises the tubular portion outer surface, the infinite cylindrical surface comprising the outer lobe surface of said at least one of the plurality of lobes.

11. The suction member of claim 10 wherein each of the plurality of lobes is disposed entirely within said infinite cylindrical volume circumscribed by said infinite cylindrical surface, the infinite cylindrical surface comprising the outer lobe surface of each of the plurality of lobes.

12. The suction member of claim 11 wherein the flat arc portion has a chord length that is approximately one half of the diameter of the suction inlet passageway.

13. The suction member of claim 11 wherein the flat arc portion has a chord length that is between forty percent and sixty percent of the diameter of the suction inlet passageway.

14. The suction member of claim 1 wherein the rear lobe includes a rear lobe end and the rear lobe end incorporates a flat arc portion.

15. The suction member of claim 1 wherein the plurality of frontal lobes includes three frontal lobes.

16. The suction member of claim 1 wherein each of the distal lobe surfaces comprises a distal lobe end, the distal lobe ends of the distal lobe surfaces sharing a common distal tangent plane, the distal tangent plane being inclined distally towards the rear side.

17. The suction member of claim 16 wherein each of the plurality of lobes is disposed entirely within an infinite cylindrical volume circumscribed by an infinite cylindrical surface that comprises the tubular portion outer surface, the infinite cylindrical surface comprising the outer lobe surface of each of the plurality of lobes.

18. The suction member of claim 17 wherein the rear lobe spans an angle about the tubular portion axis between one-hundred twenty degrees and one-hundred sixty degrees.

19. The suction member of claim 17 wherein each of the plurality of frontal lobes spans a respective angle about the tubular portion axis less than fifty degrees.

* * * * *